United States Patent
Li et al.

(10) Patent No.: US 10,523,605 B2
(45) Date of Patent: Dec. 31, 2019

(54) CONFORMING ELECTRONIC COMMUNICATION ATTACHMENTS TO A RECIPIENT SYSTEM'S SETTINGS

(71) Applicant: LENOVO (Singapore) PTE. LTD., New Tech Park (SG)

(72) Inventors: Scott Wentao Li, Cary, NC (US); Zhenglong Bai, Cary, NC (US); Timothy Winthrop Kingsbury, Cary, NC (US); Axel Ramirez Flores, Cary, NC (US); Justin Michael Ringuette, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 234 days.

(21) Appl. No.: 15/052,571

(22) Filed: Feb. 24, 2016

(65) Prior Publication Data
US 2017/0244599 A1    Aug. 24, 2017

(51) Int. Cl.
*H04L 12/24* (2006.01)
*H04L 12/58* (2006.01)

(52) U.S. Cl.
CPC ............ *H04L 51/08* (2013.01); *H04L 51/066* (2013.01)

(58) Field of Classification Search
CPC ....................... H04L 41/0806; H04L 51/36
See application file for complete search history.

(56) References Cited

U.S. PATENT DOCUMENTS

| | | | | |
|---|---|---|---|---|
| 7,822,874 B2* | 10/2010 | Nichols | ................ | H04W 28/06 709/217 |
| 2003/0225837 A1* | 12/2003 | Delia | ................... | G06Q 10/107 709/206 |
| 2007/0156440 A1* | 7/2007 | Sorisho | ............ | G06F 17/30017 705/1.1 |
| 2008/0091845 A1* | 4/2008 | Mills | ................... | H04L 67/2823 709/246 |
| 2009/0282107 A1* | 11/2009 | O'Sullivan | ............ | G06Q 10/00 709/206 |
| 2011/0208822 A1* | 8/2011 | Rathod | .................. | G06Q 30/02 709/206 |
| 2011/0239160 A1* | 9/2011 | Kirshenboim | ....... | G06Q 10/107 715/810 |
| 2013/0179517 A1* | 7/2013 | Grosu | ................... | H04L 51/066 709/206 |
| 2014/0040396 A1* | 2/2014 | Adams | ................ | G06Q 10/107 709/206 |
| 2014/0317754 A1* | 10/2014 | Niemela | ............ | H04L 63/1416 726/26 |

(Continued)

*Primary Examiner* — Abdullahi E Salad
(74) *Attorney, Agent, or Firm* — Kunzler Bean & Adamson (57) ABSTRACT

Apparatuses, methods, systems, and program products are disclosed for conforming electronic communication attachments to a recipient system's settings. One or more characteristics of a resource attached to an electronic communication being sent to a recipient system are determined. It is determined whether one or more characteristics of a resource conform to one or more settings of a recipient system. One or more nonconforming characteristics of a resource are adjusted prior to sending the electronic communication such that the one or more nonconforming characteristics of the resource conform to the one or more settings of the recipient system.

16 Claims, 5 Drawing Sheets

(56) References Cited

U.S. PATENT DOCUMENTS

2016/0094864 A1\* 3/2016 Basso .................. G06Q 10/101
                                                      725/12
2016/0234526 A1\* 8/2016 Wang ..................... H04N 19/68
2017/0154391 A1\* 6/2017 Watkins ................. G06Q 50/18

\* cited by examiner

CONFORMING ELECTRONIC COMMUNICATION ATTACHMENTS TO A RECIPIENT SYSTEM'S SETTINGS

BACKGROUND

Field

The subject matter disclosed herein relates to electronic communications and more particularly relates to adjusting attachments of electronic communications to conform to a recipient system's settings.

Description of the Related Art

Resources may be attached and sent using electronic communications. Recipients, however, may not receive the attached resources if the attached resources do not conform to one or more settings of the recipient's electronic communication system.

BRIEF SUMMARY

An apparatus for conforming electronic communication attachments to a recipient system's settings is disclosed. A method and computer program product also perform the functions of the apparatus. In one embodiment, an apparatus includes a processor and memory that code executable by the processor. The executable code, in one embodiment, includes code to determine one or more characteristics of a resource attached to an electronic communication being sent to a recipient system.

In a further embodiment, the executable code includes code to determine whether one or more characteristics of the resource conform to one or more settings of a recipient system. In some embodiments, the executable code includes code to adjust one or more nonconforming characteristics of a resource prior to sending an electronic communication such that the one or more nonconforming characteristics of the resource conform to one or more settings of a recipient system.

In some embodiments, the executable code includes code to determine one or more settings of a recipient system by querying a data store for the one or more settings and/or checking a configuration of the recipient system using an application programming interface ("API") for the recipient system. In some embodiments, a resource attached to an electronic communication is one of a plurality of resources attached to the electronic communication.

In a further embodiment, the executable code includes code that determines whether one or more characteristics of each resource of a plurality of resources conforms to one or more settings of a recipient system and that adjusts one or more nonconforming characteristics of each resource of the plurality of resources prior to sending the electronic communication such that the one or more nonconforming characteristics of each resource of the plurality of resources conforms to the one or more settings of the recipient system.

In some embodiments, a recipient system is one of a plurality of recipient systems where an electronic communication is being sent. In one embodiment, the executable code includes code that determines whether one or more characteristics of a resource conforms to one or more settings of each recipient system of a plurality of recipient systems, and that adjusts one or more nonconforming characteristics of the resource prior to sending the electronic communication to each recipient system such that the one or more nonconforming characteristics of the resource conforms to the one or more settings of each recipient system of the plurality of recipient systems.

In a further embodiment, the executable code includes code that notifies a user that a resource includes one or more characteristics that does not conform to one or more settings of a recipient system. In one embodiment, the executable code includes code that adjusts one or more nonconforming characteristics of a resource in response to receiving confirmation from a user to adjust the one or more nonconforming characteristics. In some embodiments, the executable code includes code that adjusts one or more nonconforming characteristics of a resource according to one or more user-defined settings.

In some embodiments, the code adjusts one or more nonconforming characteristics of a resource by resizing the resource, down-sampling the resource, encrypting the resource, compressing the resource, adding content to the resource, modifying content of the resource, and/or removing content from the resource. In various embodiments, the one or more characteristics of a resource include a size of the resource, a resolution of the resource, an encryption status of the resource, a compression status of the resource, metadata associated with the resource, and/or a type of the resource.

In some embodiment, an electronic communication includes an email, a text message, and/or an instant message. In various embodiments, one or more settings of a recipient system include a storage quota threshold, an attachment size threshold, a domain, and/or an internet protocol ("IP") address. In certain embodiments, a resource includes a video file, an audio file, an image file, a text file, a binary file, a portable document ("PDF") file, and/or a code file.

A method, in one embodiment, includes determining, by use of a processor, one or more characteristics of a resource attached to an electronic communication being sent to a recipient system. In a further embodiment, a method includes determining whether one or more characteristics of a resource conform to one or more settings of a recipient system. In some embodiments, a method includes adjusting one or more nonconforming characteristics of a resource prior to sending an electronic communication such that the one or more nonconforming characteristics of the resource conform to the one or more settings of the recipient system.

In one embodiment, a method includes determining one or more settings of a recipient system by querying a data store for the one or more settings and/or checking a configuration of the recipient system using an application programming interface ("API") for the recipient system. In certain embodiments, a method includes adjusting one or more one or more nonconforming characteristics of a resource according to one or more user-defined settings. In some embodiment, adjusting the one or more nonconforming characteristics of a resource includes resizing the resource, down-sampling the resource, encrypting the resource, compressing the resource, adding content to the resource, modifying content of the resource, and/or removing content from the resource. In some embodiments, the electronic communication includes an email, a text message, and/or an instant message.

In certain embodiments, a program product includes a computer readable storage medium that stores code executable by a processor. In some embodiments, executable code includes code to perform determining one or more characteristics of a resource attached to an electronic communication being sent to a recipient system. In a further embodiment, executable code includes code to perform determining whether one or more characteristics of a resource conform to one or more settings of a recipient system. In some embodiments, executable code includes code to perform adjusting one or more nonconforming characteristics of a resource prior to sending an electronic communication such that the one or more nonconforming characteristics of the resource conform to the one or more settings of the recipient system

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
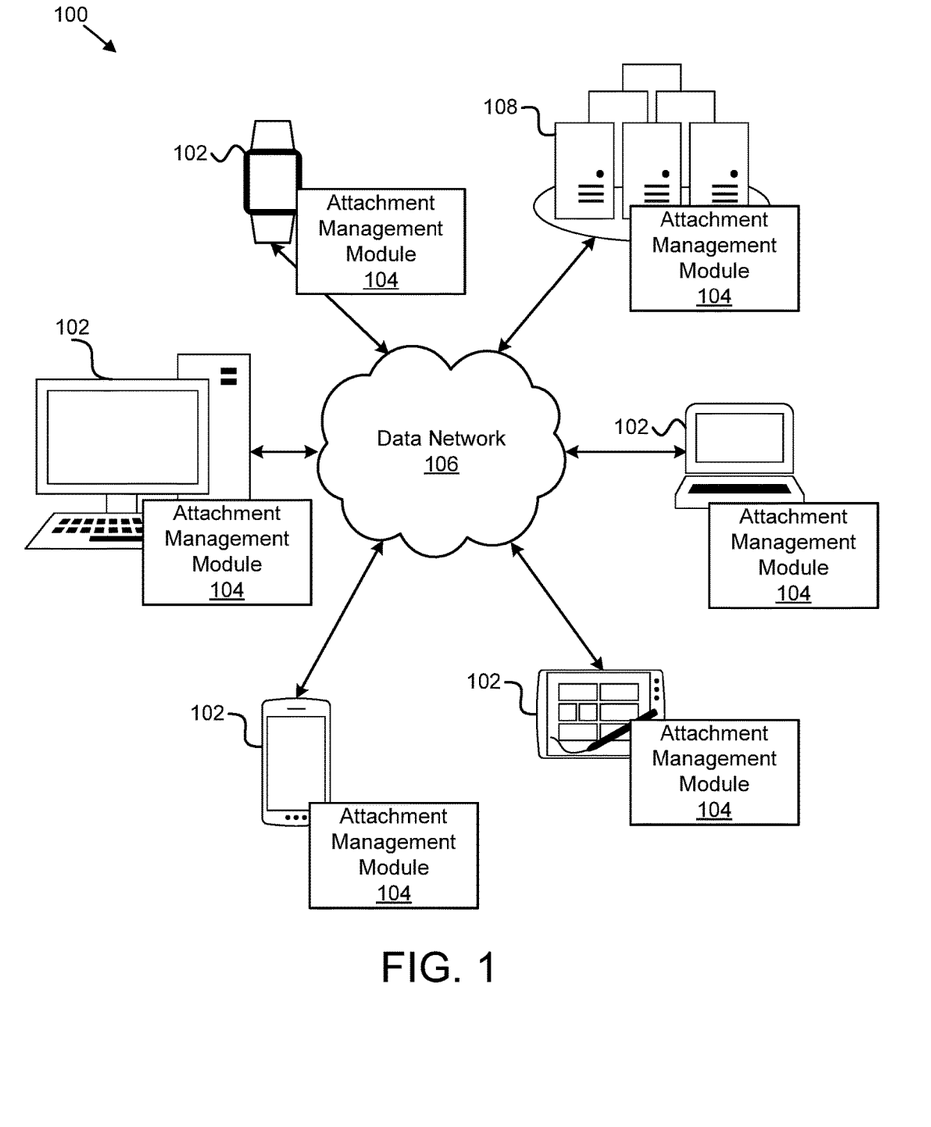
FIG. 1 is a schematic block diagram illustrating one embodiment of a system for conforming electronic communication attachments to a recipient system's settings.

FIG. 1 depicts one embodiment of a system 100 for conforming electronic communication attachments to a recipient system's settings. In one embodiment, the system 100 includes one or more information handling devices 102, one or more attachment management modules 104, one or more data networks 106, and one or more servers 108. In certain embodiments, even though a specific number of information handling devices 102, attachment management modules 104, data networks 106, and servers 108 are depicted in FIG. 1, one of skill in the art will recognize, in light of this disclosure, that any number of information handling devices 102, attachment management modules 104, data networks 106, and servers 108 may be included in the system 100 for conforming electronic communication attachments to a recipient system's settings.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more servers 108 via a data network 106, described below. The information handling devices 102, in a further embodiment, are capable of executing various programs, program code, applications, instructions, functions, or the like, which may access, store, download, upload, and/or the like data located on one or more servers 108.

In one embodiment, the attachment management module 104 is configured to verify a file attached to an electronic communication, such as an email, conforms to a recipient system's settings, and, if not, modify one or more nonconforming characteristics of the file such that it does conform to the recipient system's settings. So, in one embodiment, the attachment management module 104 determines one or more characteristics of a resource attached to an electronic communication that is being sent to a recipient system. The attachment management module 104, in a further embodiment, determines whether the one or more characteristics of the resource conform to one or more settings of the recipient system, and adjusts one or more nonconforming characteristics of the resource prior to sending the electronic communication. The attachment management module 104, including its various sub-modules 202-306, may be located on one or more information handling devices 102 in the system, one or more servers 108, one or more network devices, and/or the like. The attachment management module 104 is described in more detail below with reference to FIGS. 2 and 3.

In various embodiments, the attachment management module 104 may be embodied as a hardware appliance that can be installed or deployed on an information handling device 102, one a server 108, or elsewhere on the data network 106. In certain embodiments, the attachment management module 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a USB connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the attachment management module 104 may include a power interface, a wired and/or wireless network interface, a graphical interface that attaches to a display, and/or a semiconductor integrated circuit device as described below, configured to perform the functions described herein with regard to the attachment management module 104.

The attachment management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the attachment management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the attachment management module 104.

The semiconductor integrated circuit device or other hardware appliance of the attachment management module 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the attachment management module 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

The one or more servers 108 may be communicatively coupled (e.g., networked) over a data network 106 to one or more information handling devices 102. The one or more servers 108 may comprise an electronic communication recipient system, such as an email server, an SMS/text server, an instant message server, and/or the like. In such an embodiment, each of the one or more servers 108 may have various configuration settings, such as storage quotas (e.g., email/text/instant message storage quotas per account, per user, per organization, and/or the like), attachment size limits, encryption requirements, access lists, and/or the like. The one or more servers 108 may be accessible over the network 106 using an internet protocol ("IP") address, a media access control ("MAC") address, a domain, a web address, and/or the like.

Figure 2:
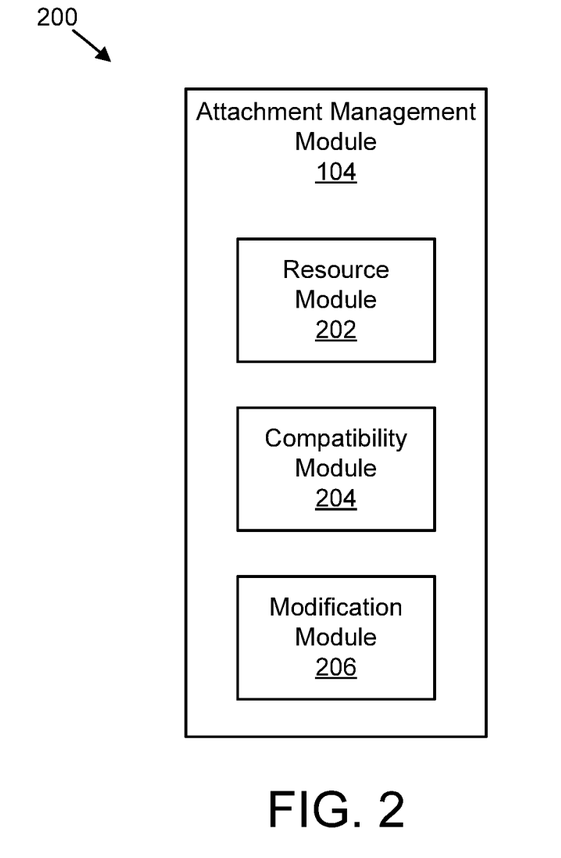
FIG. 2 is a schematic block diagram illustrating one embodiment of a module for conforming electronic communication attachments to a recipient system's settings.

FIG. 2 depicts one embodiment of a module 200 for conforming electronic communication attachments to a recipient system's settings. In one embodiment, the module 200 includes an embodiment of an attachment management module 104. The attachment management module 104, in some embodiments, includes one or more of a resource module 202, a compatibility module 204, and a modification module 206, which are described in more detail below.

The resource module 202, in one embodiment, determines one or more characteristics of a resource or file attached to an electronic communication. As used herein, an attachment for an electronic communication is a resource, such as a file, that is sent to a recipient along with the electronic communication. In certain embodiments, the electronic communication includes an email, a text message, an instant message, or the like. Thus, for example, one or more files may be attached to an email and sent along with the email to one or more recipients of the email.

In one embodiment, the resource may be a video file, an audio file, an image file, a text file, a binary file, a portable document format ("PDF") file, a code file, and/or the like. One of skill in the art, in light of this disclosure, will recognize other resource types that may be attached to an electronic communication. The one or more characteristics of the resource that the resource module 202 determines may include a size of the resource, a resolution of the resource, an encryption status of the resource, a compression status of the resource, metadata associated with the resource, a type of the resource, and/or the like. One of skill in the art, in light of this disclosure, will recognize other characteristics of a resource that the resource module 202 may determine.

In some embodiments, as described in more detail below, the electronic communication is being sent to a recipient system associated with a recipient of the electronic communication. For example, if a text message is being sent from a smart device associated with User A to a smart device associated with User B, the recipient system may be User B's smart device, a text or SMS server 108 associated with USER B, and/or the like. The recipient system may have one or more configuration settings that may affect the successful delivery of an attachment.

The compatibility module 204, in one embodiment, determines whether one or more characteristics of the resource conform to one or more settings of the recipient system associated with a recipient of the electronic communication. The one or more settings may include a storage quota threshold, an attachment size threshold, a domain, an internet protocol ("IP") address, a media access control ("MAC") address, and/or the like.

For example, the compatibility module 204 may determine that a recipient email system has a per user storage quota of 10 GB, a total email storage quota of 1 TB, and a per email attachment limit of 10 MB. In such an embodiment, the compatibility module 204 may determine whether one or more attachments that are being sent with the electronic communication conforms to the recipient email system settings. In other words, the compatibility module 204 determines whether a size of the attachment may cause a storage threshold of the recipient system to be exceeded, or whether the size of the attachment exceeds the attachment threshold.

In some embodiments, the compatibility module 204 may determine that a recipient system is hosted on a domain or a particular IP address, and based on the domain or IP address, may determine one or more settings of the recipient system. For example, if an email with an attachment is being sent to a "nsa.gov" domain, the compatibility module 204 may determine whether the characteristics of the attachment conform to an encryption setting for the domain, a compression setting for the domain, whether metadata is associated with the attachment and allowed on the domain, storage quota thresholds for the domain, and/or the like.

The modification module 206, in one embodiment, adjusts one or more nonconforming characteristics of a resource prior to sending the electronic communication so that the nonconforming characteristics conform to one or more settings of a recipient system. As used herein, a nonconforming characteristic of a resource is a characteristic of the resource that does not conform, comply, agree, or the like with a setting of a recipient system. For example, if a recipient system has a per user storage quota, and the size of the resource attached to an email would cause the recipient to exceed their storage quota on the recipient system, then the resource size would be a nonconforming characteristic.

The modification module 206 may adjust one or more nonconforming characteristics of the resource by resizing the resource, down-sampling the resource, encrypting the resource, compressing the resource, adding content to the resource, removing content from the resource, modifying content of the resource, and/or the like. Continuing with the example above, if the size of the resource does not conform to a storage quota for the recipient, the modification module 206 may change the size of the resource by removing content from the resource (e.g., removing metadata from the resource, such as exchangeable image EXIF data for an image), changing a resolution of the resource (e.g., if the resource was an image, the modification module 206 may down-sample the image so that the size of the image is smaller), and/or the like.

In one embodiment, the modification module 206 adjusts one or more nonconforming characteristics of the resource based on the domain or IP address where the resource is being sent. For example, if a resource is being sent to a recipient on with an "nsa.gov" email address, the modification module 206 may encrypt the resource, compress the resource, redact content from the resource, and/or the like according to the domain or IP address of the recipient system.

In certain embodiments, the modification module 206 adjusts the one or more nonconforming characteristics of the resource according to one or more user-defined settings. In some embodiments, a user defines one or more profiles, policies, or the like that specify what to do with an attached resource that has one or more characteristics that do not conform to the settings of a recipient system. For example, a user may define a policy that specifies that an attached .jpeg image may be down-sampled, encrypted, and compressed to conform to storage quota requirements, domain-specific encryption settings, and/or the like of a recipient system.

In some embodiments, the user-defined settings may vary per characteristic of the resource, per recipient, per recipient domain, based on an attachment type, and/or the like. For example, a policy may specify that an attached resource that does not conform to a storage quota requirement of a recipient system for recipient A be resized, while the same policy may specify that the attached resource be discarded for not conforming to a storage quota requirement of a recipient system of recipient B. Similarly, if a text file attached to an email is sent to a recipient system hosted at a "gmail.com" domain, the policy may specify that the text file be encrypted prior to sending the email.

In certain embodiments, if the modification module 206 cannot adjust the one or more nonconforming characteristics of the resource to conform to the one or more settings of the recipient system, the modification module 206 may transmit the resource to a shared storage location to make the resource accessible to the recipient. For example, if the resource is a zip file, or other archive file, and the modification module 206 determines that it cannot compress the zip file any further, the modification module 206 may transmit the zip file to a shared storage location where it is accessible to the recipient. The shared storage location may comprise a network storage location, a cloud storage location (e.g., Dropbox®), and/or the like. The modification module 206 may send a notification to the recipient that the resource is available at the shared storage location.

In one embodiment, an electronic communication may include a plurality of attached resources. For example, an email may include two or more attached files. In such an embodiment, the resource module 202 determines one or more characteristics of each attached resource, the compatibility module 204 determines whether the characteristics of each resource attached to the electronic communication conforms to the settings of the recipient system, and the modification module 206 adjusts one or more nonconforming characteristics of each resource being sent to the recipient system so that the characteristics of the resource conforms to the settings of the recipient system.

In one embodiment, an electronic communication may be sent to a plurality of recipient systems. For example, a text message may be sent to each of a group of contacts. In such an embodiment, the resource module 202 determines one or more characteristics of an attached resource, the compatibility module 204 determines whether the characteristics of the resource attached to the electronic communication conforms to the settings of each the recipient system, and the modification module 206 adjusts one or more nonconforming characteristics of the resource being sent to each recipient system prior to the electronic communication being sent to each recipient system.

Figure 3:
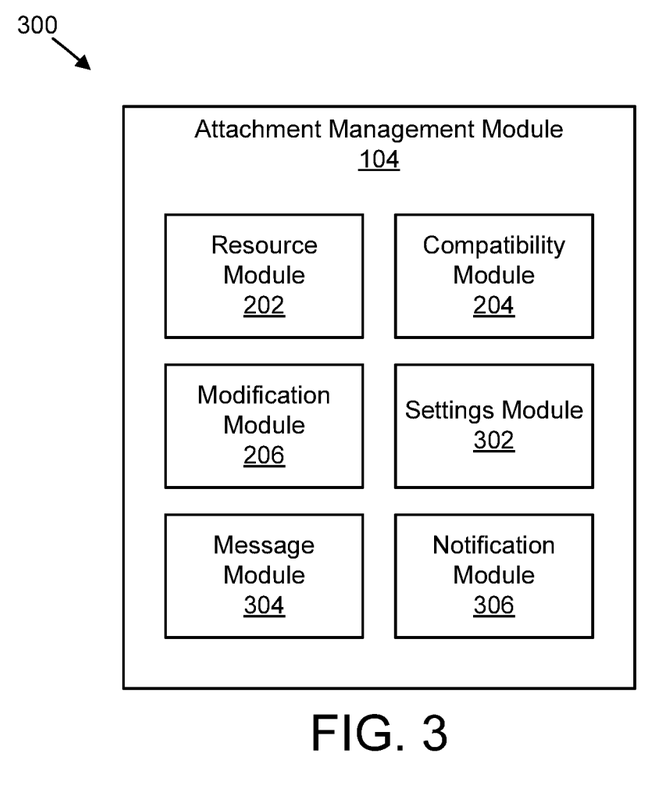
FIG. 3 is a schematic block diagram illustrating one embodiment of another module for conforming electronic communication attachments to a recipient system's settings.

FIG. 3 depicts one embodiment of another module 300 for conforming electronic communication attachments to a recipient system's settings. In one embodiment, the module 300 includes an embodiment of an attachment management module 104. The attachment management module 104, in some embodiments, includes one or more of a resource module 202, a compatibility module 204, and a modification module 206, which may be substantially similar to the resource module 202, the compatibility module 204, and the modification module 206 described above with reference to FIG. 2. The attachment management module 104 may also include one or more of a settings module 302, a message module 304, and a notification module 306, which are described in more detail below.

The settings module 302, in one embodiment, is configured to determine one or more settings of a recipient system by querying a data store, database, table, or the like for the one or more settings of the recipient system. In some embodiments, the storage module 302 maintains and accesses a data store stored locally, e.g., on a server 108 associated with the sender of the electronic message or remotely, e.g., on a cloud server, a network server, at the recipient system, and/or the like. For example, the settings module 302 may update a local or remote data store associated with an email server for the sender of the electronic message in response to determining one or more settings of a recipient system. Thereafter, the settings module 302 may perform a lookup in the local or remote data store based on a recipient of the electronic message to determine one or more settings of the recipient system where the electronic message is being sent.

In a further embodiment, the settings module 302 determines one or more settings of a recipient system by checking a configuration of a recipient system using an application programming interface ("API") associated with the recipient system. For example, a recipient system that includes an email server may provide access to its configuration settings, e.g., total storage quota, per user/email account storage quota, attachment size thresholds, allowed attachment types, and/or the like, using an API. Accordingly, the settings module 302 may use one or more function calls provided by the API to determine various settings of the recipient system.

In certain embodiments, the settings module 302 determines the settings of the recipient system using an API in real-time prior to the electronic communication being sent. For example, the settings module 302 may use the API of the recipient system to determine the settings of the recipient system prior to sending the electronic message. In some embodiments, the settings module 302 periodically checks the settings of a known or commonly used recipient system and updates the data store with new, deleted, or updated data for a recipient system.

The message module 304, in one embodiment, is configured to detect an electronic communication with an attached resource being sent to a recipient system. For example, the message module 304 may detect that an instant message with an attachment is being sent to a recipient system in response to a resource being attached to the instant message, in response to the sender performing an action to send the message, and/or the like. The message module 304, in response to detecting the electronic communication includes an attached resource, notifies or triggers the resource module 202 to determine one or more characteristics of the attached resource, which the compatibility module 204 may compare to the settings of the recipient system to determine whether the attached resource conforms to the settings of the recipient system. In certain embodiments, after the modification module 206 determines that the attached resource conforms to the settings of the recipient system, the message module 304 sends the electronic communication to the recipient system.

The notification module 306, in one embodiment, is configured to notify a user that an attached resource includes one or more characteristics that does not conform to one or more settings of a recipient system. For example, in response to the user triggering transmission of a text message, the notification module 306 may present a warning, alarm, notice, and/or the like, in an interface of a text messaging application to notify the user that an attached file does not conform to an attachment size limit for the recipient system. The user may configure an electronic communication application (e.g., by selecting a notification setting in an email application, a text application, an instant message application, and/or the like) to notify the user if an attached resource does not comply with the settings of a recipient system. The user may configure when to be notified based on the types of attached resources being sent, where the electronic message is being sent (IP address, MAC address, domain, and/or the like), and/or the like.

In certain embodiments, the notification module 306 prompts the user to confirm adjusting one or more characteristics of an attached resource. For example, if a file attached to an email does not conform to an encryption requirement of the recipient system's domain, the notification module 306 may prompt the user for confirmation to encrypt the attached file prior to the modification module 206 adjusting the file. If the user agrees, the notification module 306 may trigger the modification module 206 to adjust the encryption status of the file; otherwise, the notification module 306 and/or the message module 304 may discard the attached file so that it is not sent to the recipient system. The notification module 306 may also present to the user one or more options for adjusting the attached resource, such as a plurality of compression options, a plurality of encryption options, a plurality of resizing options, and/or the like.

In some embodiments, the notification module 306 presents one or more profiles, policies, and/or the like for adjusting the nonconforming characteristics of the attached resource. For example, the user may select profile A to adjust an image being sent to recipient A by changing the resolution of the image to 800×600, and profile B to adjust an image being sent to recipient B by changing the resolution of the image to 1440×900, and so on. The notification module 306 may notify the user how the attached resource will be adjusted in order to ensure the attached resource conforms to the recipient system's settings. For example, the notification module 306 may notify the user that an attached file will have the metadata stripped, will be encrypted using a particular encryption algorithm, will be compressed using a particular compression algorithm, and/or the like.

Figure 4:
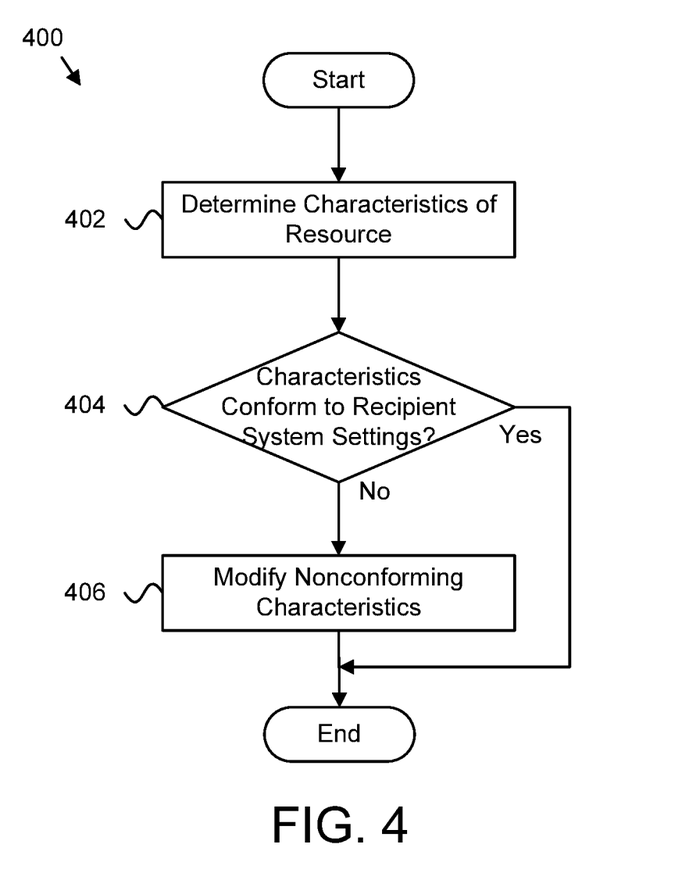
FIG. 4 is a schematic flow chart diagram illustrating one embodiment of a method for conforming electronic communication attachments to a recipient system's settings.

FIG. 4 depicts one embodiment of a method 400 for conforming electronic communication attachments to a recipient system's settings. In one embodiment, the method 400 begins and the resource module 202 determines 402 one or more characteristics of a resource attached to an electronic communication. In some embodiments, the electronic communication is being sent to a recipient system.

In a further embodiment, the compatibility module 204 determines 404 whether one or more characteristics of the attached resource conforms to one or more settings of the recipient system. If the compatibility module 204 determines 404 that the attached resource's characteristics conform to the recipient system, the method 400 ends. If the compatibility module 204 determines 404 that the attached resource includes nonconforming characteristics, the modification module 206 modifies 406 the nonconforming characteristics of the attached resource prior to sending the electronic communication, and the method 400 ends.

Figure 5:
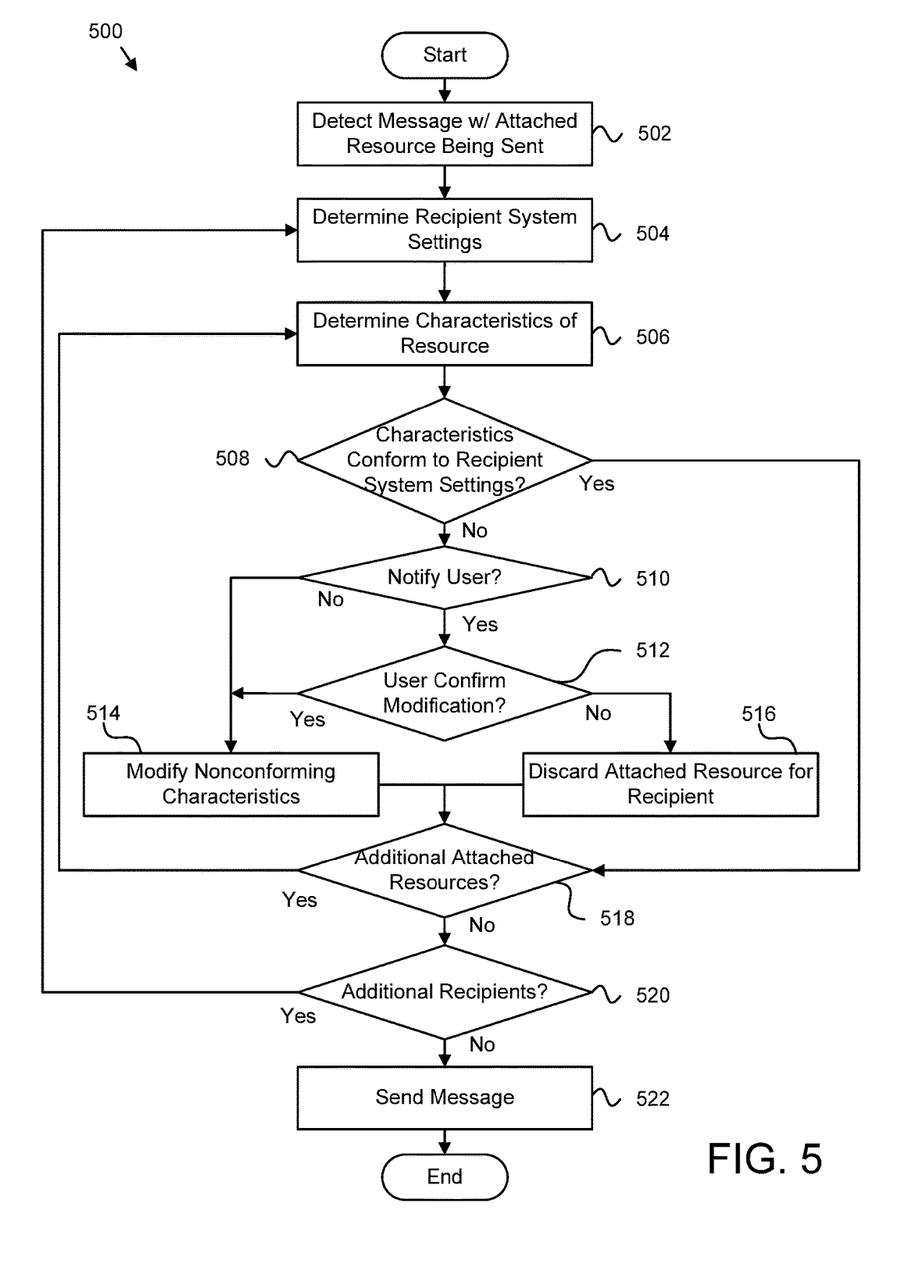
FIG. 5 is a schematic flow chart diagram illustrating one embodiment of another method for conforming electronic communication attachments to a recipient system's settings.

FIG. 5 depicts one embodiment of another method 500 for conforming electronic communication attachments to a recipient system's settings. In one embodiment, the method 500 begins and the message module 304 detects 502 an electronic communication that includes an attached resource being sent to a recipient system. The settings module 302, in some embodiments, determines 504 one or more settings of the recipient system and the resource module 202 determines 506 one or more characteristics of the attached resource.

In one embodiment, the compatibility module 204 determines 508 whether one or more characteristics of the attached resource conforms to one or more settings of the recipient system. If the compatibility module 204 determines 508 that the attached resource's characteristics conform to the recipient system, the message module 304 may determine 518 whether the electronic communication includes additional attachments. If so, the resource module 202 determines 506 one or more characteristics of the attached resource, and the compatibility module determines 508 whether the attached resource's characteristics conform to the settings of the recipient system.

If the compatibility module 204 determines 508 that the attached resource includes nonconforming characteristics, the notification module 306 may determine 510 whether to notify the user that the electronic communication includes nonconforming characteristics. If the notification module 306 determines 510 that the user should be notified, the notification module 306 prompts the user to confirm 512 adjusting the nonconforming characteristics of the attached resource. If the notification module 306 determines 512 that the user declined adjusting the nonconforming characteristics of the attached resource, the notification module 306 or the message module 304 discards 516 the attached resource and the message module 304 determines 518 whether the electronic message includes additional attached resources.

If the notification module 306 determines 510 that the user should not be notified, or if the notification module 306 determines 510 that the user should be notified and determines 512 that the user confirmed modification of the nonconforming characteristics of the attached resource, the modification module 206 modifies 514 the nonconforming characteristics of the attached resource prior to sending the electronic communication.

If the message module 304 determines 518 that additional resources are attached to the electronic message, the resource module 202 determines 506 one or more characteristics of the additional attached resource, and so on. Otherwise, the message module 304 determines 520 whether the attached resource(s) is being sent to a plurality of recipients. If so, the settings module 302 determines 504 one or more settings of the recipient system, and so on. Otherwise, the message module 306 sends 522 the electronic communication to the recipient(s), and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
        determine one or more characteristics of a resource attached to an electronic communication, the electronic communication intended for a plurality of recipient systems where the electronic communication is being sent;
        receive one or more settings for each recipient system, the one or more settings defining requirements for receiving an attachment at each recipient system of the plurality or recipient systems, the one or more settings for a recipient system defined according to a domain that the recipient system is associated with;
        determine whether the one or more characteristics of the resource conforms to the one or more settings of each recipient system of the plurality of recipient systems;
        notify a user that the resource comprises one or more characteristics that do not conform to one or more settings of each recipient system in response to determining that the one or more characteristics of the resource do not conform to the one or more settings of the recipient system;
        prompt the user for confirmation to adjust the one or more characteristics of the resource, the prompt comprising information describing how the one or more characteristics of the resource will be adjusted so that the resource conforms to the one or more settings of the recipient system; and
        adjust one or more nonconforming characteristics of the resource prior to sending the electronic communication to each recipient system in response to receiving confirmation from the user to adjust the one or more nonconforming characteristics such that the one or more nonconforming characteristics of the resource conforms to the one or more settings of each recipient system of the plurality of recipient systems.

2. The apparatus of claim 1, wherein the code is further executable by the processor to determine the one or more settings of each recipient system by one or more of querying a data store for the one or more settings and checking a configuration of the recipient system using an application programming interface ("API") for the recipient system.

3. The apparatus of claim 1, wherein the resource attached to the electronic communication is one of a plurality of resources attached to the electronic communication.

4. The apparatus of claim 3, wherein the code is further executable by the processor to:
- determine whether one or more characteristics of each resource of the plurality of resources conforms to one or more settings of each recipient system; and
- adjust one or more nonconforming characteristics of each resource of the plurality of resources prior to sending the electronic communication such that the one or more nonconforming characteristics of each resource of the plurality of resources conforms to the one or more settings of each recipient system.

5. The apparatus of claim 1, wherein the code is further executable by the processor to adjust the one or more nonconforming characteristics of the resource according to one or more user-defined settings.

6. The apparatus of claim 1, wherein the code adjusts the one or more nonconforming characteristics of the resource by one or more of:
- resizing the resource;
- down-sampling the resource;
- encrypting the resource;
- compressing the resource;
- adding content to the resource;
- modifying content of the resource; and
- removing content from the resource.

7. The apparatus of claim 1, wherein the one or more characteristics of the resource is selected from the group consisting of:
- a size of the resource;
- a resolution of the resource;
- an encryption status of the resource;
- a compression status of the resource;
- metadata associated with the resource; and
- a type of the resource.

8. The apparatus of claim 1, wherein the electronic communication is selected from the group consisting of:
- an email;
- a text message; and
- an instant message.

9. The apparatus of claim 1, wherein the one or more settings of the recipient system is selected from the group consisting of:
- a storage quota threshold;
- an attachment size threshold;
- a domain; and
- an internet protocol ("IP") address.

10. The apparatus of claim 1, wherein the resource is selected from the group consisting of:
- a video file;
- an audio file;
- an image file;
- a text file;
- a binary file;
- a portable document format ("PDF") file; and
- a code file.

11. A method comprising:
- determining, by use of a processor, one or more characteristics of a resource attached to an electronic communication, the electronic communication intended for a plurality of recipient systems where the electronic communication is being sent;
- receiving one or more settings for each recipient system, the one or more settings defining requirements for receiving an attachment at each recipient system of the plurality or recipient systems, the one or more settings for a recipient system defined according to a domain that the recipient system is associated with;
- determining whether the one or more characteristics of the resource conforms to the one or more settings of each recipient system of the plurality of recipient systems;
- notifying a user that the resource comprises one or more characteristics that do not conform to one or more settings of each recipient system in response to determining that the one or more characteristics of the resource do not conform to the one or more settings of the recipient system;
- prompting the user for confirmation to adjust the one or more characteristics of the resource, the prompt comprising information describing how the one or more characteristics of the resource will be adjusted so that the resource conforms to the one or more settings of the recipient system; and
- adjusting one or more nonconforming characteristics of the resource prior to sending the electronic communication to each recipient system in response to receiving confirmation from the user to adjust the one or more nonconforming characteristics such that the one or more nonconforming characteristics of the resource conforms to the one or more settings of each recipient system of the plurality of recipient systems.

12. The method of claim 10, further comprising determining the one or more settings of each recipient system by one or more of querying a data store for the one or more settings and checking a configuration of the recipient system using an application programming interface ("API") for the recipient system.

13. The method of claim 10, further comprising adjusting the one or more one or more nonconforming characteristics of the resource according to one or more user-defined settings.

14. The method of claim 10, wherein adjusting the one or more nonconforming characteristics of the resource comprises one or more of:
- resizing the resource;
- down-sampling the resource;
- encrypting the resource;
- compressing the resource;
- adding content to the resource;
- modifying content of the resource; and
- removing content from the resource.

15. The method of claim 10, wherein the electronic communication is selected from the group consisting of:
- an email;
- a text message; and
- an instant message.

16. A program product comprising a computer readable storage medium that is not a transitory signal, the computer readable storage medium storing code executable by a processor, the executable code comprising code to perform:
- determining one or more characteristics of a resource attached to an electronic communication, the electronic communication intended for a plurality of recipient systems where the electronic communication is being sent;
- receiving one or more settings for each recipient system, the one or more settings defining requirements for receiving an attachment at each recipient system of the plurality or recipient systems, the one or more settings for a recipient system defined according to a domain that the recipient system is associated with;

determining whether the one or more characteristics of the resource conforms to the one or more settings of each recipient system of the plurality of recipient systems;

notifying a user that the resource comprises one or more characteristics that do not conform to one or more settings of each recipient system in response to determining that the one or more characteristics of the resource do not conform to the one or more settings of the recipient system;

prompting the user for confirmation to adjust the one or more characteristics of the resource, the prompt comprising information describing how the one or more characteristics of the resource will be adjusted so that the resource conforms to the one or more settings of the recipient system; and adjusting one or more nonconforming characteristics of the resource prior to sending the electronic communication to each recipient system in response to receiving confirmation from the user to adjust the one or more nonconforming characteristics such that the one or more nonconforming characteristics of the resource conforms to the one or more settings of each recipient system of the plurality of recipient systems.

* * * * *